United States Patent [19]

Shinoda

[11] 3,960,126
[45] June 1, 1976

[54] PRESSURE REGULATOR OF LIQUEFIED-GAS FUEL SYSTEM FOR INTERNAL COMBUSTION ENGINES

[75] Inventor: Kazuo Shinoda, Toyota, Japan

[73] Assignee: Toyota Jidosha Kogyo Kabushiki Kaisha, Toyota, Japan

[22] Filed: May 20, 1974

[21] Appl. No.: 471,193

[30] Foreign Application Priority Data
Jan. 12, 1974   Japan.................................. 49-6793

[52] U.S. Cl.......................... 123/120; 123/140 MP; 137/505.47; 261/DIG. 68
[51] Int. Cl.² ........................................ F02M 21/02
[58] Field of Search ............... 123/120, 121, 276 F, 123/140 MP, 140 MC; 137/505.46, 505.47; 48/184, 191; 261/69 A, DIG. 68

[56] References Cited
UNITED STATES PATENTS

| | | | |
|---|---|---|---|
| 2,516,828 | 7/1950 | Reggio | 123/MC |
| 3,339,581 | 9/1967 | Courtot | 136/505.47 |
| 3,650,254 | 3/1972 | McJones | 123/120 |
| 3,730,146 | 5/1973 | Moulds et al. | 123/140 MP |
| 3,779,529 | 12/1973 | Kimura | 261/69 A |

Primary Examiner—Charles J. Myhre
Assistant Examiner—Paul Devinsky
Attorney, Agent, or Firm—Spensley, Horn & Lubitz

[57] ABSTRACT

A pressure regulator of the liquefied-gas fuel system for internal combustion engines has two cooperative diaphragms which partition the space inside the regulator body into three separate chambers. The diaphragms are operatively connected by a spring disposed therebetween, the first one defining two of the three chambers, namely a pressure-regulating chamber and a back-pressure chamber, and the second one defining the back-pressure chamber and a suction-pressure chamber. In the pressure-regulating chamber is installed a valve whose opening is controlled by the first diaphragm to control the supply of the liquefied-gas fuel. The second diaphragm is moved according to the intake-manifold vacuum, and the first diaphragm is correspondingly moved to control the valve, thus regulating the pressure of the fuel in the pressure-regulating chamber.

10 Claims, 5 Drawing Figures

PRESSURE REGULATOR OF LIQUEFIED-GAS FUEL SYSTEM FOR INTERNAL COMBUSTION ENGINES

BACKGROUND OF THE INVENTION

1. Field of the Invention

This invention relates to a pressure regulator of the liquefied-gas fuel system for internal combustion engines.

2. Prior Art

In conventional fuel feed systems of this character, the fuel from a liquefied-petroleum-gas (hereinafter called "LPG") tank is vaporized with pressure reduction to about atmospheric by a pressure regulator, and the fuel in a gaseous state is admitted to the venturi throat of a carburetor where it is mixed with suction air before being delivered to the engine cylinders.

The existing LPG supplying apparatus have disadvantages. Dust and other impurites carried by the suction air tend to clog the filter of the air cleaner and, when partially clogged, the filter will provide a greater resistance to the air passing therethrough and will thereby increase the negative pressure in the venturi of the carburetor. Such an increased negative pressure causes the venturi to draw in more LPG and less air, with the result that the engine is supplied with an overrich fuel. In addition, because the gas reduced in pressure to about atmospheric by the pressure regulator is delivered to the carburetor, the pressure is often too low for the gas to mix well with air in the venturi, and the air-fuel ratio is likely to be affected by the intake pulsation of the engine. Furthermore, the ordinary fuel supplying apparatus tend to produce too lean fuel mixtures because of their inability to respond aptly to the quick changes in the quantity of suction air during the engine acceleration.

An LPG supplying apparatus capable of eliminating the foregoing disadvantages of the conventional systems and of supplying an engine with a gaseous mixture at a proper air-fuel ratio has already been proposed. (Japanese Patent Application No. 11416/73)

In the proposed apparatus, LPG is gasified by a pressure regulator and, in an adequate proportion to the suction air, metered into the carburetor. The apparatus permits the use of a relatively high pressure, e.g. at 0.2 – 0.6 kg/cm$^2$, and hence satisfactory mixing of suction air and gasified fuel.

The above-mentioned fuel supplying apparatus for internal combustion engines includes an air valve turnably supported by a shaft above the throttle valve in the carburetor, and is equipped with a controller for opening and closing the air valve under controlled conditions. The controller has a housing and a diaphragm that partitions the space inside the housing into two chambers, one of which is communicated with the space above the air valve in the carburetor, and the other chamber with the space between the air valve and throttle valve in the carburetor. Inside the latter chamber is disposed a spring capable of maintaining the diaphragm in a balanced state against the differential between the pressures exerted on the opposite sides of the diaphragm. The air valve and diaphragm are operatively connected by linkage.

However, the prior art apparatus is designed for operation with a preset air-fuel ratio and cannot meet any engine requirement for fuel with different ratios. In other words, the apparatus once set for ordinary or part-load operation would no longer suit for operation at heavier loads, for example at full load. Usually, with internal combustion engines that burn liquefied gases, the air-fuel ratio of the mixture is preferably 15:1 for light-load operation and 12:1 for full-load operation. Thus, if the air-fuel ratio can be automatically switched during the engine operation from the light-load to the full-load condition and vice versa, the afore-described liquefied fuel supplying apparatus would be able to maintain the preset air-fuel ratio regardless of the amount of suction air, and it should be clear that a technical progress would then be achieved over the original proposal.

SUMMARY OF THE INVENTION

It is therefore a principal object of the invention to provide a pressure regulator capable of switching the air-fuel ratio of the gaseous mixture to either of two values depending on the operating condition of the engine. The regulator having the air-fuel-ratio switching action is installed between the liquefied gas fuel source and the carburetor.

The pressure regulator according to the invention has two coactable diaphragms, and the space inside the regulator body is partitioned by the two diaphragms into three chambers. The diaphragms are operatively connected to each other by a spring extended therebetween. The first diaphragm constitutes the boundary between two of the three chambers, i.e., pressure-regulating and back-pressure chambers, and the second diaphragm constitutes the boundary between the back-pressure chamber and the third chamber, i.e., a suction-pressure chamber. The second diaphragm is also spring-loaded. Inside the pressure-regulating chamber there is installed a valve for controlling the fuel supply to the valve, with the opening of the valve controlled by the first diaphragm. The first diaphragm is driven, in such a manner as to determine the pressure of the fuel being supplied, by a spring whose driving force for the first diaphragm is controlled by the second one. The expansive force of the spring for driving the first diaphragm is controlled by the second diaphragm, which in turn is driven by the coaction of a spring with a change in the intake-manifold vacuum. Thus, because the first diaphragm can work according to the intake-manifold vacuum via the second diaphragm, the opening of the valve that is driven by the first diaphragm is controlled by the change of the vacuum. It follows that, while the fuel pressure in the pressure-regulating chamber is controlled by the intake-manifold vacuum, the fuel pressure is determined by the operating condition of the engine.

Moreover, according to the present invention, the expansive forces of the springs that act on the individual diaphragms are adjustable to suit the type of the engine or the fuel pressure required.

Other and further objects, features and advantages of the invention will appear more fully from the following description taken in conjunction with the accompanying drawings.

DESCRIPTION OF THE PRESENTLY PREFERRED EMBODIMENT

Figure 1:
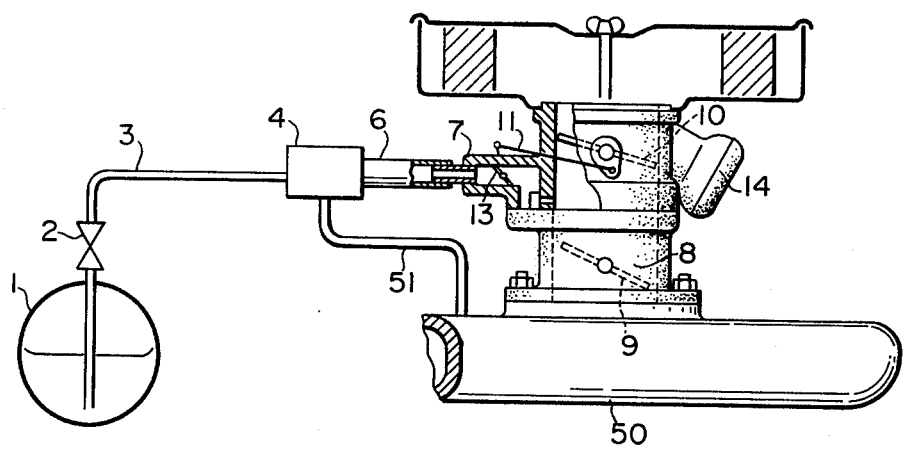
FIG. 1 is a schematic representation of a liquefied-gas fuel system incorporating the pressure regulator according to the present invention.
Figure 5:
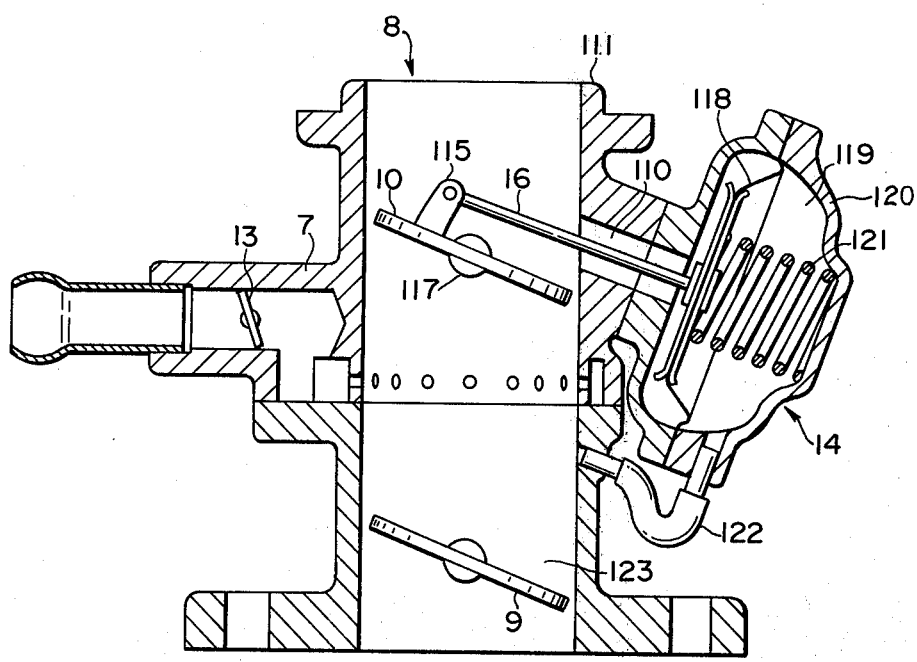
FIG. 5 is a vertical sectional view of means for automatically controlling the air valve of a carburetor.

Referring to FIG. 1 there is schematically shown a liquefied-gas fuel system of an internal combustion engine incorporating the pressure regulator of the invention. An LPG tank 1 is communicated with the inlet connection union of the pressure regulator 4 via a valve 2 and through a fuel line 3. The outlet connection union of the pressure regulator 4 is communicated with the inlet of the fuel metering unit 7 of a carburetor 8 through hose 6. In the carburetor, an air valve 10 is installed above the throttle valve 9. The air valve 10 is operatively connected to a diaphragm of an automatic controller 14 and also to a metering valve 13 of the metering unit 7 through linkage 11, so that the metering valve 13 coacts with the air valve 10. The automatic controller 14 for the air valve comprises, as shown in FIG. 5, a diaphragm 118 which is operatively connected to the air valve 10 by an arm 115 fixed to the valve and a connecting rod 16. The diaphragm 118 of the controller is accommodated in a housing 120, which is secured to the surrounding wall of the upper half body 111 of the carburetor. Since the diaphragm 118 is gastightly sealed along its periphery to the inner wall surface of the housing 120, a suction chamber 119 is defined therebetween. The space on the side of the diaphragm 118 opposite to the suction chamber 119 is communicated with the space above the air valve 10 in the upper half body 111 of the carburetor 8 via a passage 110. On the other hand, a pipe 122 establishes communication between the suction chamber 119 in the housing 120 and a constant-pressure chamber 123 defined between the air valve 10 and the throttle valve 9. Between the diaphragm 118 and the inner wall surface of the outer end of the housing 120 is interposed a spring 121 that biases the diaphragm 118 toward the carburetor.

With the construction described above, the controller operates in such a way that, when there occurs any difference between the pressure in the space above the air valve 10 and the pressure in the constant-pressure chamber 123, the diaphragm 118 is deformed against the spring 121 to turn the air valve 10 by means of the connecting rod 16.

As noted above, the diaphragm 118 of the automatic controller 14 is actuated, upon a change in the amount of suction air, by the pressure differential between the upstream and downstream pressures that act on the opposite sides of the air valve 10, and is stopped when the pressure differential has been balanced with the spring load. As the air valve 10 is opened or closed depending upon the amount of suction air, the metering valve 13 in operative connection with the air valve 10 stated above is opened or closed accordingly, and when the air valve 10 stops, the metering valve 13 stops, too, with the same opening as that of the air valve. Fuel is delivered to the carburetor 8 at a rate corresponding to the opening of the metering valve 13.

The pressure in the space above the air valve 10 in the carburetor 8 acts on one side of the diaphragm 118, whereas the pressure (negative) in the space between the air valve 10 and the throttle valve 9 in the carburetor acts on the other side of the diaphragm 118. The stream of air drawn into the engine via the carburetor 8 while the engine is running is at or near the atmospheric pressure. In the space below the throttle valve 9 the pressure is usually lower than at the suction port because the air pressure varies with the opening of the throttle valve 9. The air valve 10, which can restrict the flow of air through the space above the throttle valve 9, reduces the pressure of air in the space below the air valve to a value lower than the pressure in the vicinity of the suction port. Further the pressure in the space below the throttle valve 9 is lower than that above the throttle valve (i.e., below the air valve 10). In these pressure relations, the differential between the pressures in the spaces above and below the air valve 10 deforms the diaphragm 118 and, when the differential pressure and spring load are balanced, the diaphragm 118 is kept stationary. This relationship may be represented by the following equations.

The relations of forces in the diaphragm chambers can be expressed as $$A (P_o - P) = W + lk \ldots \qquad (1)$$

where $P_o$ = pressure in the space above the air valve
$P$ = pressure in the space below the air valve, or in the constant-pressure chamber
$A$ = effective area of the diaphragm
$W$ = mounting load of the spring when the air valve is in the fully closed position
$k$ = spring constant of the spring
$l$ = amount of displacement of the diaphragm from its normal position due to full closing of the air valve If the diaphragm spring is designed to have a minimized spring constant, then $$A (P_o - P_1) = W \qquad (2)$$

$$P_o - P = \frac{W}{A} \qquad (3)$$

The air valve remains stable with an opening that satisfies the condition of Eq. (3).

As will be appreciated from the foregoing equations, the balance spring that works on the diaphragm must be designed to have the least possible and negligible spring constant. If the spring is designed in this way, the spring load should always be balanced with the pressure ($P_o - P$), as will be obvious from Eq. (3). Since the pressure ($P_o - P$) is constant, the opening of the air valve relative to the quantity of air that passes through the carburetor can be determined as a function of the air quantity.

When an increased load on the engine requires a greater power output or a higher engine speed, the opening of the throttle valve 9 is, of course, increased. At added throttle opening, the pressure (negative) in the region 123 between the air valve and throttle valve naturally decreases. The pressure drop, in turn, widens the difference between the pressures being exerted on the opposite sides of the diaphragms 118 to such an extent that the diaphragm deforms itself, compressing the balance spring 121, with a consequent increase in the opening of the air valve. The further opening of the air valve raises the pressure in the region 123 between the air valve and throttle valve. This results in a decrease in the difference between the pressures on the both sides of the diaphragm, which combines with the action of the balance spring to deform the diaphragm back to its original position. The return of the diaphragm accordingly reduces the opening of the air valve. The diaphragm becomes stationary when, in the operative relation between the diaphragm and air valve, the difference between the pressures (Po) and (P) has become equal to the predetermined value (W/A).

The opening of the air valve for a given quantity of suction air is found from the approximate expression $$GA = C \ Av \sin \theta \ \sqrt{Po - P} \quad (4)$$

where, Ga = quantity of suction air entering the engine

Av = area of air valve
C = flow coefficient of the air valve opening
$\theta$ = opening of the air valve Hence, if $$\theta = \sin^{-1} \frac{Ga}{C \sqrt{Po - P}}$$

$$\frac{1}{C \sqrt{Po - P}} = K$$

then, $$\theta = \sin^{-1} K \cdot Ga$$

and thus the opening of the air valve is determined as a function of the air quantity.

The LPG fuel supplying apparatus described above is intended to supply the carburetor always with a proper amount of fuel proportional to the opening of the throttle valve. To attain the end, a metering unit 7 having a valve 13 adapted to open or close in operative connection with the air valve 10 is installed between the fuel source 1 and the carburetor 8. The metering unit 7 has a metering valve 13 which responds to the motion of the air valve and closes or opens simultaneously with the latter.

As noted above, the presssure (P0 − P) being constant, the opening of the air valve 10 for a given air quantity will be found as a function of the air quantity, and the opening of the metering valve 13 operatively connected to the air valve 10 will also be determined as a functon of the air quantity. Thus, fuel is fed in an amount controlled relative to the amount of suction air to the carburetor and a gaseous mixture with a proper air-fuel ratio is obtained.

Figure 2:
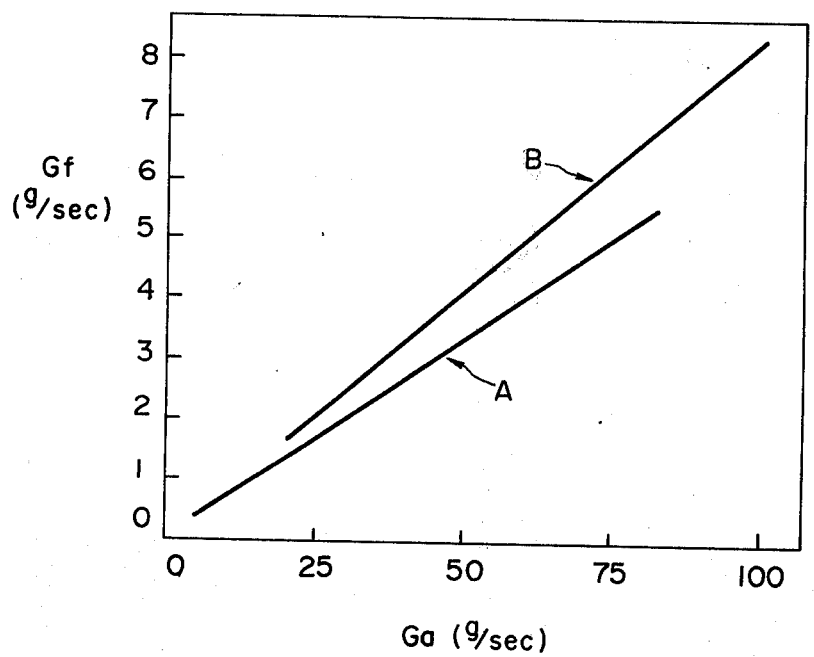
FIG. 2 is a graph showing the proper proportions of fuel and air in the mixtures suited for two different operating conditions of the engine, at light load and full load.

It is true that the fuel system described above is advantageous in that, because the metering valve works depending upon the amount of suction air, a mixture with a constant air-fuel ratio is delivered to the engine cylinders regardless of whether the air supply is large or not. Howwever, if the controller 14 were so set as to feed an optimum air-fuel mixture to the engine running at normal load or at less than the full load, then the air-fuel ratio setting would be inadequate for the full-load operation; the mixture would have to be richer than for the part-load operation. The well-known relationship, in terms of ratio, between the quantities of air and fuel for light- and full-load operations of an engine is graphically represented in FIG. 2.

Figure 3:
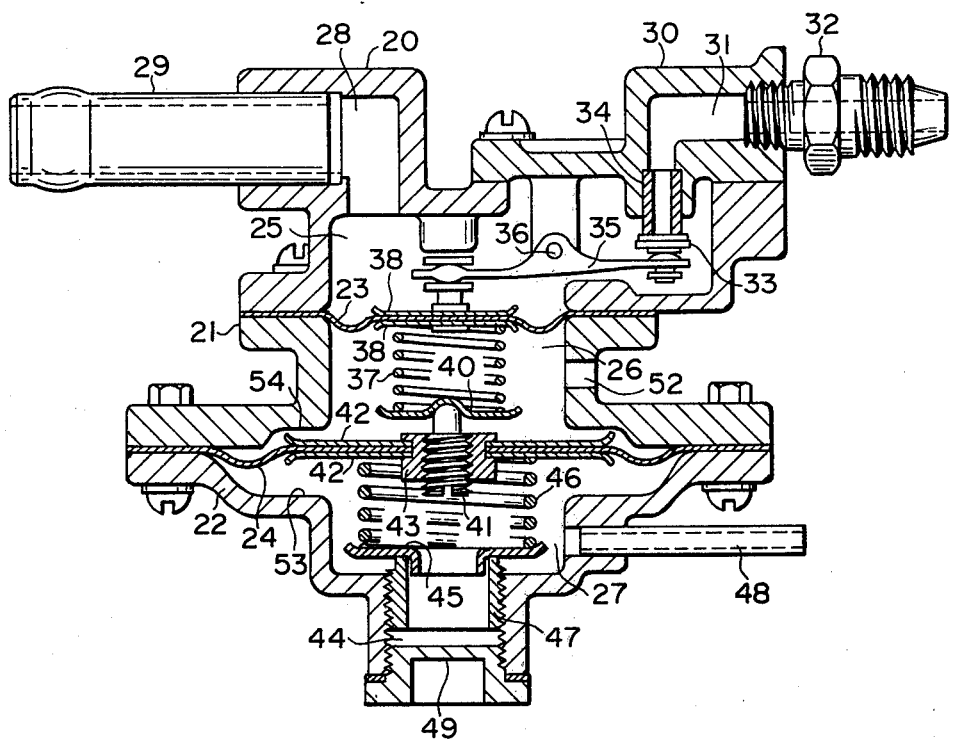
FIG. 3 is a vertical sectional view of a pressure regulator embodying the invention.

In the FIGURE, the fuel supply Gf (g/sec) is plotted as ordinate and the air supply Ga (g/sec) as abscissa. The line (A) indicates a proper air-fuel ratio of 15:1 for the light load operation, and the line (B) a proper ratio of 12:1 for the full-load operation. As will be obvious from this well-established relationship, it is very desirable for the reason above stated that the air fuel should be varied to best suit the operating conditions at part and full loads. The pressure regulator according to this invention accomplishes the switching of the air-fuel ratio as needed by changing the pressure of fuel being supplied with the degree of intake-manifold vacuum and delivering the fuel at either of two different pressures through one and the same opening of the metering valve 13 to the carburetor. An embodiment of the invention is shown in FIG. 3.

The pressure regulator of the invention has three body parts, upper 20, middle 21, and lower 22 placed one upon another and connected end to end in the order mentioned. A hollow formed by these three parts is partitioned by two diaphragms 23, 24 into three chambers, i.e., a pressure-regulating chamber 25, a back-pressure chamber 26, and a suction-pressure chamber 27. The second diaphragm 23 for pressure regulation is held between the upper part 20 and the middle part 21, and the first diaphragm 24 between the middle part 21 and the lower part 22.

The upper part 20 is formed with an outlet passage 28 for conveying fuel to the metering unit 7, and a hose connection unit 29 is fitted in the outlet passage 28 for connection to the hose 6. The inlet of the upper part 20 is open upward and covered by an inlet cover 30, which is formed with an inlet passage 31. An inlet pipe connection unit 32 is screwed into the inlet passage for connection to the line 3.

Inside the inlet cover 30, the inner end of the inlet passage 31 open in the pressure-regulating chamber 25 supports a valve seat 34 for a fuel-regulating valve 33. Fuel supplied to the inlet passage 31 enters the pressure-regulating chamber 25 through the space between the valve seat 34 and the valve 33. It will be readily seen that the quantity of fuel that passes between the valve seat 34 and the valve 33 is directly proportional to the cross-sectional area of the passage the valve provides.

The pressure regulator of the invention that supplies the engine selectively with either or mixtures at two different air-fuel ratios as described above performs its function through automatic control of the valve 33 depending on the operating condition of the engine.

To attain the end the pressure regulator has the following construction. To the inlet cover 30 is pivotally connected a lever 35 with a pin 36, rockably in the pressure regulating chamber 25. One end of the lever 35, located beneath the valve seat 34, supports the valve 33. The other end of the lever 35 is connected to the upper one of a pair of disks attached to the both sides of the diaphragm 23 by usual means.

Between the diaphragms 23 and 24 is disposed a spring 37, which is pressed at its upper end against the lower disk 38 and carried at the lower end by a spring-seat disk 40, which in turn is supported by the diaphragm 24. The spring-seat disk 40 is pivotally mounted on an adjust screw 41 which is secured to a pair of disks 42 sandwiching the diaphragm 24. The adjust screw 41 is screwed into an internally threaded hole of a block 43 secured to the disk 42.

The diaphragm 24 is urged upward by a spring 46 disposed between the lower disk 42 and a spring-seat disk 45, which is supported by an adjust screw 47 for the spring 46 screwed in a threaded opening 44. The opening is closed by a plug 49.

The suction-pressure chamber 27 defined by the lower part 22 and the diaphragm 24 is connected to a connection union 48 for communication with the intake manifold 50 of the engine through a line 51, as shown in FIG. 1.

The middle part 21 is formed with an opening 52 for communication with the atmosphere, so that the pressure in the back-pressure chamber 26 defined between the diaphragms 23 and 24 in the middle part 21 is kept equal to the atmospheric pressure.

During the part-load operation of the engine, the pressure in the intake manifold 50 is fairly negative. The negative pressure on vacuum is fed to the suction-pressure chamber 27 through the line 51 and the union 48. When the vacuum in the suction-pressure chamber 27 is approximately equal to that in the intake manifold 50, the diaphragm 24 is deformed downward, against the expansive force of the spring 46, by the differential pressure between the atmospheric pressure in the back-pressure chamber 26 and the negative pressure in the suction-pressure chamber, until the lower disk 42 secured to the diaphragm 24 is brought down into contact with the shoulder 53 of the lower part 22. When the negative pressure in the suction-pressure chamber 27 is at such a high level that the diaphragm 24 is deformed downward, the adjust screw 41 coupled to the diaphragm 24 descends, too. The adjust screw 41 in the lower position exerts less compressive force on the spring 37 and therefore less pressure force on the underside of the diaphragm 23, with the consequence that the diaphragm 23 is brought downward by the differential between the expansive force of the spring 37, the second spring, and the pressure in the pressure-regulating chamber 25 that is exerted on the upper side of the diaphragm 23. The downward deformation of the diaphragm 23 causes the lever 35 connected at one end to the upper disk 38 on the diaphragm to rock counterclockwise, raising its other end. Then, the valve 33 carried by the other end comes close to the valve seat 34, reducing the space through which the fuel flows. Naturally the amount of fuel entering the pressure-regulating chamber 25 decreases as well as the pressure of the fuel in the chamber. At this point the fuel pressure in the pressure-regulating chamber 25 corresponds to the opening of the valve 33 relative to its seat 34 in the state where the fuel pressure applicable to the effective area of the diaphragm 23 is balanced with the expansive force of the spring 37. When the spring-seat disk 40 is in the lower position, the force that the spring 37 exerts on the diaphragm 23 is so weak that the diaphragm is deformed downward, yielding to the pressure in the pressure-regulating chamber 25 as described above. This deformation narrows the space between the valve 33 and the valve seat 34 and reduces the pressure in the pressure-regulating chamber 25. As the pressure decreases in this way, the diaphragm 23 moves back or upward, thereby increasing the opening of the valve once again, until the diaphragm stops at the point where the pressures are balanced as already described.

The diaphragm 24 is in the position shown in FIG. 3 when the engine is in the full-load operation. At this time the pressure in the intake manifold of the engine is very close to the atmospheric pressure, and therefore the diaphragm 24 is urged upward by the spring 46. The upward movement of the diaphragm 24 pushes the spring 37 upward, through the screw 41 and the spring-seat disk 40, out of balance with the pressure in the pressure-regulating chamber 25, deforming the diaphragm 23 upward. The deformation in turn causes clockwise rocking of the lever 35 with a consequent increase in the opening of the valve 33 with respect to the valve 34, accompanied by a pressure rise in the pressure-regulating chamber 25. The increased pressure corresponds to the opening of the valve members 33, 34 when the diaphragm 23 is stationary with the expansive force of the spring 37 in balance with the pressure exerted on the effective area of the diaphragm 23. The pressure is such that, because the spring 37 is in the raised position, the diaphragm 23 is kept stationary by the pressure in the pressure-regulating chamber higher than when the engine is running at part load.

Figure 4:
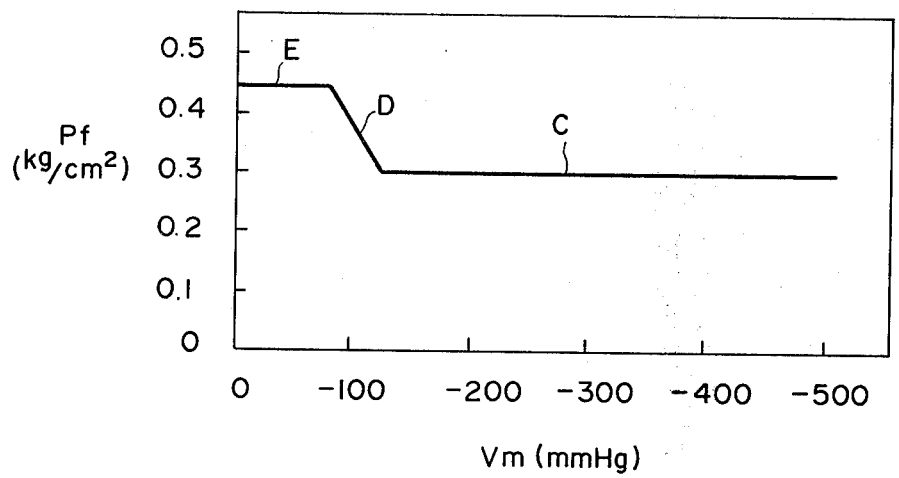
FIG. 4 is a graph illustrating the relation between the intake vacuum and fuel pressure in the pressure regulator shown in FIG. 3.

FIG. 4 graphically indicates the two suction-pressure conditions described above. The pressure (kg/cm$^2$) of fuel that is fed to the carburetor, or the pressure in the pressure-regulating chamber 25, is plotted on the vertical axis and the vacuum in the intake manifold 50, or the pressure (mmHg) in the suction-pressure (vacuum) chamber 27, horizontally. As noted above, the pressure in the intake manifold varies with the engine load. The negative pressure in the manifold is about −100 mmHg or higher at part load and about −100 mmHg or near the atmospheric pressure at full load. It is therefore desirable to switch the air-fuel ratio of the fuel being fed to the engine, at a point where the intake-manifold vacuum of about −100 mmHg has been reached, in the manner illustrated in FIG. 2 and described in connection with the graph.

In order to satisfy the above requirement, in accordance with the present invention, the diaphragm 24 is designed for a constant stroke. For this purpose the lower end of the middle part 21 is stepped inwardly to provide an upper-limit face 54 for keeping the diaphragm 24 from further ascent. Similarly the upper end of the lower part 22 is provided with a lower-limit face 53. When the engine runs at light load, with the intakemanifold vacuum of −100 mmHg or downward, the diaphragm 24 deforms downward as already described, bringing the lower disk 42 secured thereto into contact with the lower-limit face 53. The disk 42 in contact with the face 53 is kept from further descent, and the diaphragm 24 is no longer deformable downward. A further decrease of the suction pressure does not actuate the diaphragm 24, and the spring 37 is in the state corresponding to the descent of the diaphragm 24 in its lowermost position. The spring 37 maintains this state despite any further decline of the (negative) pressure in the suction-pressure chamber 27. As shown in FIG. 4, the diaphragm 23 remains in the constant position when the negative pressure in the suction-pressure chamber 27 is less than about −110 mmHg, maintaining the pressure of the fuel supplied through the valve members 33, 34 to the pressure-regulating chamber 25 at a constant level. This condition is represented by the line section (C) in FIG. 4. As can be seen from the graph, the line (C) is parallel to the horizontal axis, and the fuel pressure indicated on the vertical axis is constant while the pressure in the intake-manifold is in the range of less than about −120 mmHg. To be more specific, the fuel pressure is steadily maintained at 0.3 kg/cm².

Because the metering valve 13 and the air valve 10 are designed to open to the same degrees and because the opening of the air valve 10 is a function of the quantity of air drawn into the carburetor 8, the metering valve 13 operates to supply the carburetor 8 with a quantity of fuel corresponding to that of suction air. The quantity of fuel that passes through the metering valve is directly proportional to the fuel pressure, as will be clear from the general equation $$Gf = CA\ Pf$$

where Gf = quantity of fuel passing through the $Gf$ = quantity of fuel passing through the metering valve
$C$ = flow coefficient of the metering valve
$A$ = cross-sectional area of the opening of the metering valve
$Pf$ = pressure of the fuel As will be appreciated from the equation, the quantity of fuel is proportional to the opening of the metering valve and the fuel pressure. It follows that if either the fuel pressure or the valve opening is constant the fuel quantity will vary as a function of the other factor. According to the present invention, therefore, the fuel requirements for two different operating conditions i.e., at light load and full load, are met by maintaining a constant fuel pressure in each case and controlling the fuel quantity through the opening of the metering valve to suit the particular operating condition.

When the engine runs at full load, the pressure in the intake manifold is approximately equal to the atmospheric pressure. The pressure is conducted through the line 48 to the suction-pressure chamber 27, and the diaphragm 24 is deformed upward in the manner described until the disk 42 thereon contacts the upper-limit face 54. As shown in FIG. 4, the upward deformation of the diaphragm 24 begins as an intake-manifold vacuum of about −100 mmHg is exceeded. The deformation goes on with the rise of the pressure until the disk 42 is stopped by the upper-limit face 54. At this point the pressure in the suction-pressure chamber 27 is approximately −80 mmHg. This change in the intake-manifold vacuum actuates the diaphragm 24, thereby changing the pressure of the fuel being supplied to the pressure-regulating chamber 25 through the valve members 33, 34, as indicated by the line (D) in FIG. 4. Once the disk 42 on the diaphragm 24 has come in contact with the upper-limit face 54, the diaphragm 24 will no longer move despite a further rise of the suction pressure, and will maintain the fuel pressure constant as indicated by the line (E). Actually the fuel pressure in this case will be in the order of 0.45 kg/cm². The rise of the fuel pressure is accompanied by an increase in the fuel supply to the carburetor as already noted, with the air-fuel ratio changed along the line (B) in FIG. 2.

In order to change the pressure of the fuel being supplied to the carburetor in conformity with the intake-manifold vacuum along the line C-D-E or E-D-C in FIG. 4, fine adjustment of the spring 37, 46 is necessary. The end is attained in accordance with the present invention, as described above, by providing the adjust screw 41 in the diaphragm 23 through the disks 42 for the adjustment of the spring 37 for the diaphragm 23 and also by providing the adjust screw 47 for the spring 46, the first spring, associated with the diaphragm 24.

The adjust screw 41, if screwed deep in the block supported by the diaphragm 24, will raise the fuel pressure in the pressure-regulating chamber 25 while leaving the diaphragm 24 unmoved. When loosened, the adjust screw 41 will reduce the fuel pressure in the pressure-regulating chamber 25. On the other hand, the adjust screw 47 when screwed in will increase the negative pressure to pull the diaphragm 24 downward. Loosening the screw will decrease the working vacuum.

What is claimed is:

1. A pressure regulator for a liquefied-gas fuel system in an internal combustion engine comprising:
   a. a regulator body forming a space partitioned into three chambers; namely,
      i. a pressure-regulating chamber communicating with a liquefied-gas fuel source and a carburetor, said pressure-regulating chamber having a fuel inlet passage communicating with said liquefied-gas fuel source, and a fuel outlet passage communicating with said carburetor;
      ii. a back-pressure chamber communicating with the atmosphere; and
      iii. a suction-pressure chamber communicating with an intake system of said engine by an intake port coupled to an intake manifold such that a vacuum is selectively formed in said suction-pressure chamber;
   b. a first diaphragm forming a boundary between said pressure-regulating chamber and said back-pressure chamber;
   c. a second diaphragm forming a boundary between said back-pressure chamber and said suction-pressure chamber;
   d. a first spring mounted in said suction-pressure chamber, said first spring disposed against said second diaphragm and said pressure-regulating body adjacent the bottom thereof;
   e. a screw adjustment means secured in said first diaphram for selectively engaging said second spring and limiting the downward movement thereof;
   f. a second spring mounted in said back-pressure chamber, said second spring disposed against said first and second diaphragms;
   g. a fuel regulating valve disposed in said fuel inlet passage of said pressure-regulating chamber; and
   h. an actuating lever having first and second ends, said first end operatively connected to said fuel regulating valve and said second end operatively coupled to said first diaphragm, said actuating lever disposed in said pressure-regulating chamber such that when said first diaphragm is disposed downward, said first end of said lever is caused to deactuate said regulating valve thereby decreasing the amount of fuel supplied to said pressure-regulating chamber, and when said first diaphragm is disposed upward, said first end of said lever is caused to actuate said regulating valve thereby increasing the amount of fuel supplied to said pressure-regulating chamber,
   said first and second springs are arranged and configured in said pressure-regulator such that for predetermined pressures in three chambers, said actuating lever is caused to selectively regulate the fuel supplied to said pressure-regulating chamber.

2. The pressure regulator according to claim 1 wherein said second spring is supported at the bottom thereof by a seat, said seat adapted to be selectively engaged by said second diaphragm when said second diaphragm is disposed upward.

3. The pressure regulator according to claim 1 wherein said first spring is supported at the bottom thereof by seat, said seat adapted to be selectively disposed toward the bottom of said regulator body when the pressure in said suction-pressure chamber is approximately equal to the pressure in said intake manifold.

4. The pressure regulator according to claim 1 wherein said back-pressure chamber is provided with an upper-limit face for stopping said second diaphragm from travel in the upward direction, and said suction-pressure chamber is provided with a lower-limit face for stopping said second diaphragm from travel in the downward direction.

5. The pressure regulator according to claim 2 wherein said first diaphragm has an adjustment means secured thereto, said adjustment means for selectively engaging said seat and disposing said second spring upward when said first diaphragm is disposed upward, and for limiting the downward travel of said second spring.

6. The pressure regulator according to claim 5 wherein said adjustment means is a screw.

7. The pressure regulator according to claim 3 wherein said seat is adapted to be engaged by an adjustment means, said adjustment means for controlling the extent of travel of said first spring in the downward direction.

8. The pressure regulator regulator according to claim 7 wherein said adjustment means is a screw disposed in a hole on the bottom of said suction-pressure chamber.

9. The pressure regulator according to claim 1 wherein disks are disposed on either side of said first and second diaphragms.

10. A pressure regulator for a liquefied-gas fuel system in an internal combustion engine comprising:
 a. a regulator body forming a space partitioned into three chambers; namely,
  i. a pressure-regulating chamber communicating with a liquefied-gas fuel source and a carburetor, said pressure-regulating chamber having a fuel inlet passage communicating with said liquefied-gas fuel source, and a fuel outlet passage communicating with said carburetor;
  ii. a back-pressure chamber communicating with the atmosphere; and
  iii. a suction-pressure chamber communicating with an intake system of said engine by an intake port coupled to an intake manifold such that a vacuum is formed in said suction-pressure chamber;
 b. a first diaphragm forming a boundary between said pressure-regulating chamber and said back-pressure chamber;
 c. a second diaphragm forming a boundary between said back-pressure chamber and said suction-pressure chamber;
 d. a first spring mounted in said suction-pressure chamber, said first spring disposed against said second diaphragm and pressure-regulator adjacent the bottom thereof;
 e. a second spring mounted in said back-pressure chamber, said second spring disposed against said first and second diaphragms;
 f. a fuel regulating valve disposed in said fuel inlet passage of said pressure-regulating chamber;
 g. an actuating means for regulating fuel to said pressure-regulating chamber, said actuating means operatively connected to said fuel regulating valve and to said first diaphragm, said actuating means disposed in said pressure-regulating chamber such that when said first diaphragm is disposed downward, said means deactuate said regulating valve thereby decreasing the amount of fuel supplied to said pressure-regulating chamber, and when said first diaphragm is disposed upward, said means actuates said regulating valve thereby increasing the amount of fuel supplied to said pressure-regulating chamber;
 h. an adjustment means disposed in said first diaphragm, said adjustment means for selectively engaging said second spring and limiting the downward travel thereof; and
 i. an adjustment means, said adjustment means for controlling the extent of travel of said first spring in the downward direction.

* * * * *